United States Patent [19]

Kollah et al.

[11] Patent Number: 5,908,912
[45] Date of Patent: *Jun. 1, 1999

[54] ELECTRODEPOSITABLE COATING COMPOSITION CONTAINING BISMUTH AND AMINO ACID MATERIALS AND ELECTRODEPOSITION METHOD

[75] Inventors: Raphael O. Kollah; Matthew S. Scott, both of Pittsburgh; Gregory J. McCollum, Gibsonia; Joseph A. Bethoski, Pittsburgh, all of Pa.

[73] Assignee: PPG Industries Ohio, Inc., Cleveland, Ohio

[21] Appl. No.: 08/868,411

[22] Filed: Jun. 3, 1997

Related U.S. Application Data

[60] Provisional application No. 60/025,326, Sep. 6, 1996.

[51] Int. Cl.[6] .................... C08G 18/80; C08G 18/16; C08G 18/22; C25D 13/08; C25D 13/06; C25D 13/10

[52] U.S. Cl. .................... 528/45; 204/499; 204/501; 204/502; 204/504; 204/505; 427/430.1; 427/435; 427/457; 427/458; 502/167; 502/170; 502/200; 502/353; 523/414; 523/415; 523/416; 524/590; 524/591; 524/594; 524/596; 524/597; 524/598; 524/612; 524/724; 524/780; 524/840; 525/396; 525/398; 525/452; 525/453; 525/481; 525/523; 525/528; 528/48; 528/52; 528/73; 528/92; 528/93; 528/236; 528/406; 528/407; 528/409; 528/71

[58] Field of Search ................ 204/499, 501, 204/502, 504, 505; 427/430.1, 435, 457, 458; 502/167, 170, 200, 353; 523/414, 415, 416; 524/590, 591, 594, 596, 597, 598, 612, 724, 780, 840; 525/396, 398, 452, 453, 481, 523, 528; 528/45, 48, 52, 73, 92, 93, 236, 406, 407, 409, 71

[56] References Cited

U.S. PATENT DOCUMENTS

| | | | |
|---|---|---|---|
| 2,453,234 | 11/1948 | Koch | 554/114 |
| 3,455,806 | 7/1969 | Spoor et al. | 204/181 |
| 3,655,748 | 4/1972 | Tandara | 562/553 |
| 3,663,389 | 5/1972 | Koral et al. | 204/181 |
| 3,793,278 | 2/1974 | De Bona | 523/414 |
| 3,796,751 | 3/1974 | Fuhrmann et al. | 562/553 |
| 3,928,157 | 12/1975 | Suematsu et al. | 204/181 |
| 3,947,339 | 3/1976 | Jerabek et al. | 204/181 |
| 3,959,106 | 5/1976 | Bosso et al. | 204/181 |
| 3,972,890 | 8/1976 | Botta | 548/152 |
| 3,984,299 | 10/1976 | Jerabek | 204/181 |
| 4,007,154 | 2/1977 | Schimmel et al. | 523/435 |
| 4,009,133 | 2/1977 | Jones | 523/421 |
| 4,017,662 | 4/1977 | Gehman et al. | 428/443 |
| 4,101,390 | 7/1978 | Rhees et al. | 204/57 |
| 4,104,147 | 8/1978 | Marchetti et al. | 204/181 C |
| 4,116,900 | 9/1978 | Belanger | 523/404 |
| 4,134,866 | 1/1979 | Tominaga et al. | 523/415 |
| 4,134,932 | 1/1979 | Kempter et al. | 525/481 |
| 4,145,465 | 3/1979 | Sanderson et al. | 428/31 |
| 4,148,772 | 4/1979 | Marachetti et al. | 523/415 |
| 4,186,124 | 1/1980 | Schimmel et al. | 525/528 |
| 4,230,522 | 10/1980 | Martin et al. | 156/638 |
| 4,238,594 | 12/1980 | Pampouchidis | 528/69 |
| 4,278,580 | 7/1981 | Schmolzer et al. | 523/415 |
| 4,423,166 | 12/1983 | Moriarity et al. | 523/414 |
| 4,432,850 | 2/1984 | Moriarity et al. | 204/181 C |
| 4,468,307 | 8/1984 | Wismer et al. | 204/181 C |
| 4,485,259 | 11/1984 | Jerabek et al. | 564/292 |
| 4,517,330 | 5/1985 | Zdanowski et al. | 524/408 |
| 4,530,945 | 7/1985 | Christenson et al. | 523/400 |
| 4,540,725 | 9/1985 | Jerabek et al. | 523/400 |
| 4,715,898 | 12/1987 | Johnson | 106/308 Q |
| 4,931,157 | 6/1990 | Valko et al. | 204/181.7 |
| 4,933,056 | 6/1990 | Corrigan et al. | 204/181.7 |
| 5,008,351 | 4/1991 | Paar | 525/528 |
| 5,074,979 | 12/1991 | Valko et al. | 204/181.7 |
| 5,096,556 | 3/1992 | Corrigan et al. | 204/181.7 |
| 5,130,004 | 7/1992 | Johnson et al. | 204/181.7 |
| 5,294,737 | 3/1994 | Ojima | 562/444 |
| 5,330,839 | 7/1994 | Yasuoka et al. | 428/413 |
| 5,391,789 | 2/1995 | Rohrmann | 556/11 |
| 5,401,512 | 3/1995 | Rhodes et al. | 424/458 |
| 5,507,928 | 4/1996 | Böhmert et al. | 204/488 |
| 5,525,666 | 6/1996 | Hoenel et al. | 524/458 |
| 5,554,700 | 9/1996 | Schipfer et al. | 525/360 |
| 5,565,508 | 10/1996 | Hoenel et al. | 523/414 |
| 5,587,448 | 12/1996 | Engen | 528/55 |
| 5,612,395 | 3/1997 | Nojiri et al. | 523/415 |
| 5,670,441 | 9/1997 | Foedde et al. | 502/200 |

FOREIGN PATENT DOCUMENTS

| | | |
|---|---|---|
| 1090288 | 9/1994 | China . |
| 0 653 467 | 5/1995 | European Pat. Off. . |
| 690106 | 1/1996 | European Pat. Off. . |
| 4434593 | 4/1996 | Germany . |
| 93 2977 | 4/1993 | South Africa . |
| 2227032 | 7/1990 | United Kingdom . |
| WO93/24578 | 12/1993 | WIPO . |
| WO95/07319 | 3/1995 | WIPO . |
| WO95/07377 | 3/1995 | WIPO . |
| WO96/10057 | 4/1996 | WIPO . |

OTHER PUBLICATIONS

Kirk–Othmer Encyclopedia of Chemical Technology, Second Revised Edition, vol. 2, pp. 157–159, 170, 174, 183, 185 (1963).

*Primary Examiner*—Rabon Sergent
*Attorney, Agent, or Firm*—Wiliam J. Uhl

[57] ABSTRACT

An electrodepositable coating composition is provided comprising (a) an active hydrogen-containing, cationic salt group-containing resin electrodepositable on a cathode; (b) a curing agent for transurethanation, transamidation or transesterification curing like at least a partially capped polyisocyanate curing agent; and (c) a catalytic mixture of bismuth and an amino acid or amino acid precursor. Optionally, an auxiliary acid may be present to increase the effectiveness of the amino acid in the mixture with bismuth.

23 Claims, No Drawings

5,908,912

ELECTRODEPOSITABLE COATING COMPOSITION CONTAINING BISMUTH AND AMINO ACID MATERIALS AND ELECTRODEPOSITION METHOD

This application claims the benefit of U.S. Provisional Application No. 60/025,326, filed Sep. 6, 1996.

FIELD OF THE INVENTION

The present invention relates to cationic electrodepositable coating compositions containing novel catalysts and to their use in electrodeposition.

BACKGROUND OF THE INVENTION

The application of a coating by electrodeposition involves depositing a film-forming composition to an electrically conductive substrate under the influence of an applied electrical potential. Electrodeposition has gained prominence in the coatings industry because in comparison with nonelectrophoretic coating methods, electrodeposition provides higher paint utilization, outstanding corrosion resistance and low environmental contamination. Early attempts at commercial electrodeposition processes used anionic electrodeposition where the workpiece being coated served as the anode. However, in 1972 cationic electrodeposition was introduced commercially. Since that time cationic electrodeposition has become increasingly popular and today it is the most prevalent method of electrodeposition. For instance, cationic electrodeposition is the process of choice for applying a primer coating in the manufacture of motor vehicles throughout the world.

Many cationic electrodeposition coating compositions used today are based on active hydrogen-containing resins derived from a polyepoxide and a capped polyisocyanate curing agent. These cationic electrodeposition compositions conventionally contain organotin catalysts, such as dibutyl tin oxide and lead catalysts, to activate cure of the electrodeposition coating composition. Because of cost and environmental considerations, the levels of these catalysts are kept low. However, low catalyst levels may lessen the cure response of a coating composition providing weaker properties in the cured film than desired. Appearance of the cured film may also be adversely affected.

Schipfer et al. in South African Patent Application No. 93/2977 and U.S. Pat. No. 5,507,928 (Bohmert et al.) disclose the use of cationic electrodepositable coating compositions which contain catalysts that are specific complexes or salts of bismuth and carboxylic acids, in particular hydroxycarboxylic acids. As noted in these references, these catalysts are unlike available bismuth salts of relatively long-chain acids and inorganic bismuth compounds. The disclosed catalysts of these patent documents can displace the use of lead and tin compounds as catalysts for coatings in electrodeposition. The resulting electrodeposited coatings with the use of the disclosed bismuth salts reportedly have excellent application and film properties.

Unfortunately, the industrial development of bismuth salts as described above have encountered some difficulty as noted in Patent Cooperation Treaty publication no. WO95/07377, published Mar. 16, 1995. This publication notes that two disadvantages were encountered on an industrial scale for the use of the bismuth carboxylic acid salts of the aforementioned reference. One disadvantage is a tendency of the isolated and dried bismuth salts to agglomerate during storage. A second disadvantage is a necessity for the use of a greater amount of acid to digest the bismuth oxide than is required for neutralization of the paint binder resin in the electrodepositable coating composition. The invention of the WO95/07377 publication confronts these disadvantages by preparing the compositions containing the bismuth-carboxylic acid salt in a stepwise process to produce a mixture of bismuthyl lactate and bismuth lactate. The mixture is combined with the cationic paint binder to result in a bismuth content on a total solids basis of 25 to 45 weight percent for such a combined composition.

The aforementioned latter problem of digestion of the bismuth oxide by greater amounts of acid can engender an additional difficulty of a low pH of the resulting electrodeposition coating bath. Low pH for the bath of the electrodeposition coating composition generally results in more aggressive dissolution of iron from any number of sources. Several possible sources include equipment of the electrodeposition coating bath system such as that for agitation like pumps and piping that are constructed from mild steel. Also, the substrates to be electrocoated may on occasion remain in the treatment bath for some period of time without applied voltage. Soluble iron from such sources can be detrimental to the appearance of the electrocoated substrate and to the stability of the electrocoating bath.

It would be desirable to provide a curable electrodepositable coating composition which demonstrates acceptable cure response without loss of cured film properties or appearance and which contains catalysts that do not have the shortcomings of lead-type catalysts used in the art and that result in a suitable pH for the bath of the electrodepositable coating composition.

SUMMARY OF THE INVENTION

In accordance with the present invention, a curable electrodepositable coating composition is provided comprising (a) an active hydrogen-containing, cationic salt group-containing resin electrodepositable on a cathode; (b) a curing agent for transesterification; and/or transamidation and/or transurethanization curing of the resin of (a); and (c) a catalytic mixture of bismuth and at least one amine-containing carboxylic acid such as amino acid or amino acid precursor or source material. Optionally, an amount of an auxiliary acid may be present with the amino acid or amino acid precursor where the amount of such an acid results in total equivalents equal to or less than around the total equivalents of base for the curable electrodepositable coating composition (hereinafter referred to as "ED composition"). The ED composition is applied to the conducting substrate as the cathode under an applied voltage with one or more anodes.

DETAILED DESCRIPTION

In the following discussion, unless explicitly stated otherwise, the ranges of amounts, molecular weights, ratios, temperatures, time, and reaction conditions and the like usually can be varied to a degree from about the lower stated number to about the higher stated number of each specific range.

The active hydrogen-containing cationic resin of component (a) may be any suitable cationic resin known to those skilled in the art. As used herein, the term "active hydrogen-containing cationic resin" refers to a cationic resin prepared from a polymer that contains active hydrogen groups. The active hydrogens of such resins can be due to the presence of hydroxyl groups, primary and/or secondary amino groups, thiol groups and mixtures thereof on the cationic resin. The active hydrogen groups, by definition, are reactive with the crosslinking agent, particularly at elevated temperatures. Nonexclusive examples include derivatives of polyepoxide resins with or without chain extension, resins which are equivalent resins to those that contain primary and/or secondary amine groups, such as resins formed when polyepoxide is reacted with excess polyamines such as diethylenetriamine and triethylenetetraamine and the excess polyamine vacuum stripped from the reaction mixture; cationic acrylic resins; and polyepoxides that are acrylic polymers which contain epoxy groups that are formed by polymerizing an epoxy group-containing unsaturated monomer such as glycidyl acrylate or glycidyl methacrylate with one or more polymerizable ethylenically unsaturated monomers.

Preferably, the cationic resin is derived from a polyepoxide, which may be chain extended by reacting together a polyepoxide and a polyhydroxyl group-containing material selected from alcoholic hydroxyl group-containing materials and phenolic hydroxyl group-containing materials to chain extend or build the molecular weight of the polyepoxide. Such chain extension reactions may be conducted under typical conditions as known to those skilled in the art. The resin contains cationic salt groups and active hydrogen groups selected from aliphatic hydroxyl and primary and secondary amino groups.

A chain extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of 80° C. to 160° C. for 30 to 180 minutes until an epoxy group-containing resinous reaction product is obtained. The equivalent ratio of reactants, i.e., epoxy:polyhydroxyl group-containing material, is typically from 1.00:0.75 to 1.00:2.00.

Suitable polyepoxides are those having a 1,2-epoxy equivalency greater than one and preferably two; that is, polyepoxides which have on average two epoxide groups per molecule. In general the epoxide equivalent weight of the polyepoxide will range from 100 to 2000, typically from 180 to 500. The epoxy compounds may be saturated or unsaturated, cyclic or acyclic, aliphatic, alicyclic, aromatic or heterocyclic. They may contain substituents such as halogen, hydroxyl and ether groups. The preferred polyepoxides are polyglycidyl ethers of cyclic polyols. Particularly preferred are polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali using reaction conditions typical for etherification as known to those skilled in the art. Besides polyhydric phenols, other cyclic polyols can be used in preparing the polyglycidyl ethers of cyclic polyols. Examples of other cyclic polyols include alicyclic polyols, particularly cycloaliphatic polyols such as 1,2-cyclohexane diol and 1,2-bis(hydroxymethyl)cyclohexane. The preferred polyepoxides have molecular weights ranging from 180 to 500, preferably from 186 to 350. Epoxy group-containing acrylic polymers can also be used but they are not preferred.

Examples of polyhydroxyl group-containing materials used to chain extend or increase the molecular weight of the polyepoxide (i.e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials are polyhydric phenols such as Bisphenol A, phloroglucinol, catechol and resorcinol. Mixtures of alcoholic hydroxyl group-containing materials and phenolic hydroxyl group-containing materials may also be used. Bisphenol A is preferred.

The cationic salt groups of the resin are preferably incorporated into the resin by reacting the epoxy group-containing resinous reaction product prepared as described above with a cationic salt group former. By "cationic salt group former", it is meant a material which is reactive with epoxy groups and which can be acidified before, during or after reaction with the epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy groups.

When amines are used as the cationic salt formers, monoamines are preferred, and hydroxyl-containing amines are particularly preferred. Polyamines may be used but are not recommended because of a tendency to gel the resin. Tertiary and secondary amines are preferred to primary amines because primary amines are polyfunctional with respect to epoxy groups and have a greater tendency to gel the reaction mixture. If polyamines or primary amines are used, they should be used in a substantial stoichiometric excess to the epoxy functionality in the polyepoxide so as to prevent gelation and the excess amine should be removed from the reaction mixture by vacuum stripping or another technique at the end of the reaction. The epoxy may be added to the amine to ensure excess amine.

Examples of hydroxyl-containing amines are alkanolamines, dialkanolamines, trialkanolamines, alkyl alkanolamines, and aralkyl alkanolamines containing from 1 to 18 carbon atoms, preferably 1 to 6 carbon atoms in each of the alkanol, alkyl and aryl groups. Specific examples include ethanolamine, N-methylethanolamine, diethanolamine, N-phenylethanolamine, N,N-dimethylethanolamine, N-methyldiethanolamine, triethanolamine and N-(2-hydroxyethyl)-piperazine.

Amines such as mono, di and trialkylamines and mixed aryl-alkyl amines which do not contain hydroxyl groups or amines substituted with groups other than hydroxyl which do not negatively affect the reaction between the amine and the epoxy may also be used. Specific examples include ethylamine, methylethylamine, triethylamine, N-benzyldimethylamine, dicocoamine and N,N-dimethylcyclohexylamine. Mixtures of the above-mentioned amines may also be used.

The reaction of a primary and/or secondary amine with the polyepoxide takes place upon mixing of the amine and polyepoxide. The amine may be added to the polyepoxide or vice versa. The reaction can be conducted neat or in the presence of a suitable solvent such as methyl isobutyl ketone, xylene or 1-methoxy-2-propanol. The reaction is generally exothermic and cooling may be desired. However, heating to a moderate temperature of 50° C. to 1500° C. may be done to hasten the reaction.

The reaction product of the primary and/or secondary amine and the polyepoxide is made cationic and water dispersible by at least partial neutralization with an acid. Suitable acids include organic and inorganic acids such as formic acid, acetic acid, lactic acid, phosphoric acid and sulfamic acid. Sulfamic acid is preferred. The extent of neutralization varies with the particular reaction product involved. However, sufficient acid should be used to disperse the ED composition in water. Typically, the amount of acid used provides at least 20 percent of all of the total neutralization. Excess acid may also be used beyond the amount required for 100 percent total neutralization. A suitable extent of neutralization results in the ED composition having a pH of typically from around 5 to around 8 and so that the resinous phase will migrate to and electrodeposit on the cathode under the voltage imposed during the electrodeposition process.

In the reaction of a tertiary amine with a polyepoxide, the tertiary amine can be pre-reacted with the neutralizing acid to form the amine salt and then the amine salt reacted with the polyepoxide to form a quaternary salt group-containing resin. The reaction is conducted by mixing the amine salt with the polyepoxide in water. Typically, the water is present in an amount ranging from 1.75 to 20 percent by weight based on total reaction mixture solids.

In forming the quaternary ammonium salt group-containing resin, the reaction temperature can be varied from the lowest temperature at which the reaction will proceed, generally room temperature or slightly thereabove, to a maximum temperature of 100° C. (at atmospheric pressure). At higher pressures, higher reaction temperatures may be used. Preferably, the reaction temperature is in the range of 60° C. to 100° C. Solvents such as a sterically hindered ester, ether or sterically hindered ketone may be used, but their use is not necessary. Also, a portion of the amine that is reacted with the polyepoxide can be a ketimine of a polyamine, such as is described in U.S. Pat. No. 4,104,147, column 6, line 23 to column 7, line 23. The ketimine groups decompose upon dispersing the amine-epoxy resin reaction product in water. Also, as in U.S. Pat. No. 3,947,339, a polyketimine derivative of a polyamine, such as diethylenetriamine or triethylenetetraamine, can be reacted with an epoxide group-containing resin. When the reaction product is neutralized with the sulfamic acid and dispersed in water, free primary amine groups are generated. Also, equivalent products are formed when polyepoxide is reacted with excess polyamines such as diethylenetriamine and triethylenetetraamine and the excess polyamine vacuum stripped from the reaction mixture. Such products are described in U.S. Pat. Nos. 3,663,389 and 4,116,900.

In addition to resins containing amine salts and quaternary ammonium salt groups, cationic resins containing ternary sulfonium groups may be used in forming the active hydrogen-containing cationic resin in the composition of the present invention. Examples of these resins and their method of preparation are described in U.S. Pat. Nos. 3,793,278 to DeBona and 3,959,106 to Bosso et al.

The extent of cationic salt group formation should be such that when the resin is mixed with an aqueous medium and the other ingredients, a stable dispersion of the ED composition will form. By "stable dispersion", it is meant one that does not settle or is easily redispersible if some settling occurs. Moreover, the dispersion should be of sufficient cationic character that the dispersed particles will migrate toward and electrodeposit on a cathode when an electrical potential is set up between an anode and a cathode immersed in the aqueous dispersion.

Generally, the active hydrogen-containing cationic resin of the ED composition of the present invention is nongelled and contains from 0.1 to 3.0, preferably from 0.1 to 0.7 milliequivalents of cationic salt group per gram of resin solids. The number average molecular weight of the active hydrogen-containing cationic resin preferably ranges from 2,000 to 15,000, more preferably from 5,000 to 10,000. By "nongelled", it is meant that the resin is substantially free from crosslinking, and prior to cationic salt group formation, the resin has a measurable intrinsic viscosity when dissolved in a suitable solvent. In contrast, a gelled resin having an essentially infinite molecular weight would have an intrinsic viscosity too high to measure.

Besides the epoxy-amine reaction products, film-forming resins can be selected from amino group-containing acrylic copolymers such as those described in U.S. Pat. Nos. 3,455,806 and 3,928,157. Also, one-component compositions as described in U.S. Pat. No. 4,134,866 and DE-OS No. 2,707,405 can also be used as the film-forming resin.

Preferably, the active hydrogens within the active hydrogen-containing cationic resin generally are reactive with curing agents for transesterification, transamidation, and/or transurethanization with isocyanate and/or polyisocyanate curing agents under coating drying conditions. Suitable drying conditions for at least the partially capped or blocked isocyanate curing agents include elevated temperatures preferably in the range of 930° C. to 204° C., most preferably 121° C. to 177° C., as are known to those skilled in the art. Preferably, the active hydrogen-containing cationic resin will have an active hydrogen content of 1.7 to 10 milliequivalents, more preferably 2.0 to 5 milliequivalents of active hydrogen per gram of resin solids.

Typically, the active hydrogen-containing cationic resin of component (a) is present in the ED composition in amounts of 55 to 75, preferably 65 to 70 percent by weight based on weight of main vehicle resin solids. By "main vehicle resin solids", it is meant resin solids attributable to the active hydrogen-containing, cationic salt group-containing resin of component (a) and the curing agent(s) for transesterification, transamidation, or transurethanization as component (b).

The ED composition of the present invention also contains the curing agent(s) (b) for one of the aforementioned types of curing. For example, a polyisocyanate curing agent of component (b) may be a fully capped polyisocyanate with substantially no free isocyanate groups, or it may be partially capped and reacted with the resin backbone as described in U.S. Pat. No. 3,984,299 or U.S. Pat. No. 5,074,979 or as taught in U.S. Pat. No. 4,009,133. The polyisocyanate can be an aliphatic or an aromatic polyisocyanate or a mixture of the two. Diisocyanates are preferred, although higher polyisocyanates can be used in place of or in combination with diisocyanates. Generally, the capped isocyanates under appropriate drying conditions de-cap and react with reactive hydrogens as in hydroxyl groups to form urethane groups and with reactive amines to form substituted urea groups. Also, di- and polyisocyanates can de-cap or deblock under appropriate drying conditions and react as transesterification and/or transamidation crosslinkers. Nonexclusive examples of the former transesterification curing agents include those as described in European Application No. 12,463. Examples of the latter curing mechanisms involve isocyanates reacting with malonic ester or acetoacetic ester. These crosslinkers as well as other similar crosslinkers known to those skilled in the art can optionally be used for transesterification or transamidation like aminoplast resins and aldehyde condensates like phenolformaldehyde, urea-formaldehyde, triazineformaldehyde and phenol allyl ether-formaldehyde. Also, cationic electrodeposition compositions prepared from Mannich bases such as described in U.S. Pat. No. 4,134,932 can be used.

Examples of crosslinkers or curing agents that are suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4,4,',4"-triisocyanate, 1,2,4-benzene triisocyanate and polymethylene polyphenyl isocyanate.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used. A mixture of diphenylmethane-4,4'-diisocyanate and polymethylene polyphenyl isocyanate is preferred.

Any suitable aliphatic, cycloaliphatic or aromatic alkyl monoalcohol or phenolic compound may be used as a capping agent for the at least partially capped polyisocyanate curing agent in the composition of the present invention including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Diethylene glycol butyl ether is preferred among the glycol ethers. other suitable capping agents include oximes such as methyl ethyl ketoxime, acetone oxime and cyclohexanone oxime, lactams such as epsilon-caprolactam, and amines such as dibutyl amine.

The capped polyisocyanate curing agent of component (b) is typically present in the ED composition in amounts of 25 to 45, preferably 30 to 35 percent by weight based on weight of main vehicle resin solids. Typically, there is sufficient polyisocyanate present in the composition of the present invention to provide 0.1 to 1.2 capped isocyanate groups for each active hydrogen in the cationic resin of component (a).

Catalysts to promote curing which are the mixture of bismuth and an amino acid are also present in the ED composition of the present invention. Suitable sources of Ibismuth include salts and oxides thereof, such as bismuth nitrate, bismuth oxide, bismuth trioxide, and bismuth hydroxide and the like. Also, the bismuth salts can be present with other salts such as zinc salts, manganese, tin, and/or zirconium salts. Preferably, these bismuth sources can provide the bismuth for reaction, interaction, complexing, achelating, and/or association with the amino acids directly or indirectly from amino acid precursors as a catalytic mixture.

Suitable amino acids include organic compounds having primary and/or secondary amine functionality and having acid functionality, such as carboxylic acid functionality. The amino acids generally have from 2 to 20 carbon atoms. Suitable amino acids have the general formula NHR" (CRR')$_n$ COOH and are characterized by a basic amino group (like $NH_2$ or NH) and an acidic carboxyl group (COOH). The letter "n" in the formula is an integer from 1 to 19, preferably 1 to 10. The R, and R' groups are independently selected from hydrogen, unsubstituted or substituted straight chain or branched C1–C20 alkyl, unsubstituted or substituted C3–C8 cycloalkyl, C3–C8 alkenyl, C3–C8 alkynyl and C6–C14 aryl. The unsubstituted and substituted C3–C8 cycloalkyl groups mentioned above refer to cycloaliphatic hydrocarbon groups which contain 3 to 8 carbons in the ring, preferably 5 or 6 carbons, and these cycloalkyl groups substituted with one or two of C1–C4 alkyl, C1–C4 alkoxy, hydroxy or C1–C4 alkanoyloxy. The C3–C8 alkenyl and C3–C8 alkynyl groups represent straight or branched chain hydrocarbon radicals containing 3 to 8 carbons in the chain and which contain a carbon-carbon double bond or a carbon-carbon triple bond, respectively. The term "aryl" is used to include carbocyclic aryl groups containing up to 14 carbons, e.g., phenyl and naphthyl, and those substituted with one or two groups selected from C1–C4-alkyl, C1–C4 alkoxy, C1–C4-alkoxycarbonyl, C1–C4-alkanoyloxy, and C1–C4-alkanoylamino.

The amino acids may be primary or secondary amino acids and may be N-substituted. Substituents on the amino nitrogen such as the R" groups of the aforementioned chemical structure may include hydrogen, lower alkyl groups, and substituted alkyl groups having from 1 to 10 carbon atoms, such as methyl, ethyl, propyl, acetyl and the like. Also, the amino acid can have a plurality of the amine and/or acid functionality so that the amino acid is either polyamino and/or a polyacid. The amine and acid functionalities can occur anywhere on the compound, for instance, one set of amine and acid functionality can be on adjacent carbon atoms in the compound in an alpha arrangement. Other arrangements of the functionalities on the compound such as beta, delta, gamma, and omega for example, are also suitable. Preferred amino acids include, for example, alanine, glycine, N-acetyl glycine, aminocaproic acid, alpha-amino hexanoic acid (norleucine), methionine, serine, threonine, aspartic acid, (2-amino succinic acid) and the like.

In lieu of or in addition to the amino acid, one or more amino acid precursors or amino acid source compounds, that is, compounds which upon dissociation or hydrolysis generate an amino acid, can be used to provide at least one amino acid. For example, cyclic amine-containing carboxylic acid compounds that dissociate or hydrolyze to form an amino acid can be used. Suitable examples are lactam compounds like the beta-lactam compounds which through a ring-opening hydrolysis reaction form an amino acid. Examples of such reactions are disclosed in U.S. Pat. No. 2,453,234 which discloses a process for preparing an amino-carboxylic acid by hydrolyzing a lactam by means of at least 10 moles of water per mole of lactam to produce an amino-carboxylic acid. Also, such reactions can be conducted with heating aliphatic or cyclo-aliphatic lactams in the presence of more than 20 moles of water per mole of lactam to prepare amino-carboxylic acids.

Generally, the ring opening hydrolysis reaction may be performed over a wide range of temperatures but at temperatures below 150° C., the reaction rate of hydrolysis of the lactam monomer may be slow. On the other hand, it is generally not desirable to exceed temperatures above 300° C. inasmuch as polymerization of the lactam may occur. In addition, at such high temperatures, a higher operating pressure would be needed to contain the water. Accordingly, a temperature between 150° C. to 300° C. is satisfactory. Temperatures of 200° C. to 250° C. are particularly desirable in the substantial absence of oxygen. The time of the reaction is generally 2 to 10 hours, preferably 4 to 8 hours. Suitable acids that can be used for hydrolysis of the lactam are sulfuric acid, hydrochloric acid, formic acid, sulfamic acid and the like.

Particularly suitable lactam compounds are the nitrogen containing compounds with at least 3 carbon atoms per molecule, and nonexclusive examples of these are butyrolactam, valerolactam, epsilon-caprolactam, beta-propiolactam, delta-valerolactam, caprylolactam, dodecanolactam, and lactams of 4-aminobutyric acid, 6-aminohexanoic acid, 7-aminoheptanoic acid, 8-aminooctanoic acid, 9-aminononanoic acid, 10-aminodecanoic acid, 11-aminoundecanoic acid, 12-aminododecanoic acid and similar lactams known to those skilled in the art. These lactams may be substituted at the nitrogen atom by lower hydrocarbon radicals containing, for example, 1–3 carbon atoms. For example, methylcaprolactam may be used, and epsilon-caprolactam and substituted derivatives thereof are the preferred lactams.

The optional auxiliary acid that can be present with the one or more amino acids and bismuth catalytic mixture include acids such as sulfamic and/or acetic acid and/or lactic and/or formic acid and/or aliphatic hydroxycarboxylic acids like dimethylolpropionic acid and other similar organic acids. Basically, any acid can be used that lowers the pH of the catalytic mixture. Generally, the amount of acid added varies depending of the strength of the acid and the number and type of basic compounds or groups present in the ED composition. For instance, the auxiliary acid as an additional acid can be added in an amount up to less than three moles of acid per mole of bismuth metal, exclusive of the carboxylic acid functionality of the amino acid itself. Preferably, when such an auxiliary acid is used, the amount of the acid is effective to give a pH of the ED composition to which the catalytic mixture is added in the approximate range of at least around 5.5 and higher, most preferably 5.8 to 6.5. The acid is generally added after the formation of the catalytic mixture such as any bismuth and amino acid reaction product. It may be possible to add the auxiliary acid and bismuth compound and amino acid together simultaneously or sequentially in any order to the ED composition for the in-situ formation of the catalytic mixture. Nonexclusive examples of the amino acids that perform better in the catalytic mixture as the bismuth reaction product with the auxiliary acid-include: methionine, aminocaproic acid, glycine, and tyrosine.

The catalytic mixture of bismuth and an amino acid as component (c) of the ED composition is preferably a reaction product which may be prepared by reacting at least one bismuth salt or oxide with at least one amino acid in a mole ratio of 1:1 to 1:5 or for amino acid to bismuth the mole ratio is 1:1 to 5:1 and preferably 1:1 to 3.5:1 in aqueous media. In a typical reaction, amino acid and water are mixed in an appropriate vessel and heated to 70° C. Bismuth is added in small portions to the reaction mixture over several hours and the reaction mixture is stirred for six additional hours. The resulting reaction product, depending on the particular reactants, can be a solid product complex, which may be filtered out, or a dispersed or liquid reaction product.

The catalytic mixture as component (c) may be incorporated into the ED composition in several ways. It may be added as a dispersion to the final reaction mixture of the main vehicle, i.e., the active hydrogen-containing resin, just before solubilization with water and acid as described above. Alternatively, it may be added as a dispersion to a partially solubilized resin kept at sufficiently high solids so as to be sheared into the final composition. By "partially solubilized", it is meant that the resin is partially or fully neutralized with respect to amine functionality, but only partially water-thinned, i.e., diluted. Additionally, it may be co-dispersed with polyepoxide-polyoxyalkylene-polyamine modifying anti-crater resins such as those described in U.S. Pat. No. 4,423,166. It may also be dispersed in a conventional pigment grinding vehicle such as those disclosed in U.S. Pat. No. 4,007,154 by a grinding or milling process and be a component of a pigment paste.

The catalytic mixture as component (c) can be present in the ED composition of the present invention in amounts of 0.24 to 3 percent by weight, preferably 1.0 to 1.5 percent by weight bismuth based on the total weight of solids in the ED composition. These amounts are based on the ED composition that is predominantly free of lead catalysts to effect curing of the coating. In addition to the ED composition that is lead-free for catalysis of curing of the coating, the coating can also be predominantly free of tin as a catalyst for curing although it is possible to use minor catalytic amounts of tin catalysts with the bismuth amino acid catalytic mixture in the ED composition of the present invention. Also, even though the ED composition can be lead-free, the bismuth amino acid catalytic mixture would not impede the use of lead catalysts in the ED composition. So minor catalytic effective amounts of lead could be used if desired along with the bismuth amino acid catalytic mixture but such amounts of the lead compounds as well as tin compounds could be reduced from catalytic amounts where lead compounds and/or tin compounds are the only catalysts for curing the coating composition.

The ED composition of the present invention is preferably used in an electrodeposition process in the form of an aqueous dispersion. By "dispersion", it is meant a two-phase transparent, translucent or opaque aqueous resinous system in which the resin, curing agent, pigment and water insoluble materials are the dispersed phase and water and water soluble materials comprise the continuous phase. The dispersion is a stable dispersion as defined earlier. The dispersed phase can have an average particle size less than 10 microns, preferably less than 5 microns. The aqueous dispersion preferably contains at least 0.05 and usually 0.05 to 50 percent by weight resin solids, depending on the particular end use of the dispersion. Aqueous resin concentrates of the dispersion with a resin solids content of 25 to 60 percent by weight based on the weight of the aqueous dispersion can be further diluted with water upon preparation of electrodeposition baths. Fully diluted electrodeposition baths can generally have resin solids contents of 3 to 25 percent by weight.

The aqueous dispersion may optionally contain a coalescing solvent such as hydrocarbons, alcohols, esters, ethers and ketones. Examples of preferred coalescing solvents are alcohols, including polyols, such as isopropanol, butanol, 2-ethylhexanol, ethylene glycol and propylene glycol; ethers such as the monobutyl and monohexyl ethers of ethylene glycol; and ketones such as 4-methyl-2-pentanone (MIBK) and isophorone. The coalescing solvent is usually present in an amount up to 40 percent by weight, preferably ranging from 0.05 to 25 percent by weight based on total weight of the aqueous medium.

The ED composition of the present invention may further contain pigments and various other optional additives such as catalysts, plasticizers, surfactants, wetting agents, defoamers and anti-cratering agents.

Suitable pigments for the ED composition of the present invention can be incorporated into the composition in the form of a paste. The pigment paste can be prepared by grinding or dispersing a pigment into a grinding vehicle and optionally including ingredients such as wetting agents, surfactants and defoamers. Grinding is usually accomplished by the use of ball mills, Cowles dissolvers, continuous attritors and the like until the pigment has been reduced to the desired size and has been wetted by and dispersed by the grinding vehicle. After grinding, the particle size of the pigment should be as small as practical; generally, a Hegman grinding gauge rating of 6 to 8 is usually employed. Suitable pigment grinding vehicles can be selected from those known in the art.

Nonlimiting examples of pigments which can be employed in the practice of the invention include, for example, titanium dioxide, carbon black, iron oxides, clay, talc, silica, strontium chromate, coal dust, barium sulfate and phthalocyanine blue. Lead pigments may also be used but preferably are kept to a minimum even if used. Pigments with high surface areas and oil absorbencies should be used judiciously because they can have an undesirable effect on coalescence and flow. The pigment content of the dispersion is usually expressed as the pigment to resin ratio. In the practice of the invention, the pigment to resin ratio can be within the range of 0.05 to 1:1.

In addition to the above-described components, the present composition can also include various additives such as surfactants, wetting agents, catalysts, film build additives, flatting agents, defoamers, and additives like those of U.S. Pat. No. 4,423,166 to enhance flow and appearance of the composition and cationic microgels like those of U.S. Pat. No. 5,096,556 and pH control additives such as at least partially neutralized polyepoxide-amine adducts with higher pH sufficient to adjust the pH of the bath to the aforementioned desired range, if necessary.

Examples of suitable surfactants and wetting agents include alkyl imidazolines such as those available from Geigy Industrial Chemicals as GEIGY AMINE C, and acetylenic alcohols available from Air Products and Chemicals as SURFYNOL. Examples of defoamers include a hydrocarbon containing inert diatomaceous earth available from Crucible Materials Corp. as FOAMKILL 63. Examples of anti-cratering agents are polyoxyalkylene-polyamine reaction products such as those described in U.S. Pat. No. 4,432,850. These optional ingredients, when present, are usually used in an amount up to 30 percent by weight, typically 1 to 20 percent by weight based on weight of resin solids.

In the process of electrodeposition, the aqueous dispersion is placed in contact with an electrically conductive anode and cathode. Upon passage of an electric current between the anode and cathode while they are in contact with the aqueous dispersion, an adherent film of the ED composition will deposit in a substantially continuous manner on the cathode. Electrodeposition is usually carried out at a constant voltage in the range of from about one volt to several thousand volts, typically between 50 and 500 volts. Current density is usually between about 1.0 ampere and 15 amperes per square foot (10.8 to 161.5 amperes per square meter) and tends to decrease quickly during the electrodeposition process, indicating formation of a continuous self-insulating film. Any electroconductive substrate, especially metal substrates such as steel, zinc, aluminum, copper, magnesium or the like can be coated with the ED composition of the present invention. Steel substrates are preferred because the composition provides significant corrosion protection to these substrates. Although it is conventional to pretreat the steel substrate with a phosphate conversion coating followed by a chromic acid or non-chromic acid rinse, the composition of the present invention may be applied to steel substrates which have not been given a chrome rinse and still provide excellent corrosion resistance.

After deposition the coating is heated to cure the deposited composition. The heating or curing operation is usually carried out at a temperature in the range of from 120° C. to 250° C., preferably from 120° C. to 190° C. for a period of time ranging from 10 to 60 minutes. The thickness of the resultant film is usually from 10 to 50 microns.

The composition can be applied by means other than electrodeposition including brushing, dipping, flow coating, spraying and the like, but it is most often applied by electrodeposition.

The invention will be further described by reference to the following examples. Unless otherwise indicated, all parts are by weight.

EXAMPLES

A series of seven examples were conducted to form various bismuth amino acid catalytic mixtures and a comparative example was conducted to form a bismuth carboxylic acid reaction product as shown in Table I below where the amounts for the materials are in parts by weight.

TABLE I

| | CHARGE/MATERIAL | A1 | A2 | A3 | A4 | A5 | A6 | A7 | Comparative A |
|---|---|---|---|---|---|---|---|---|---|
| 1) | Bismuth trioxide ($Bi_2O_3$) | 100 | 200 | 200.00 | 200.00 | 65.24 | 200.0 | 100.00 | 200.0 |
| 2) | amino acid | | | | | | | | |
| | d,l-Alanine | 133.6 | | | | | | | |
| | glycine[1] | — | 225.5 | | | | | | |
| | 6-aminocaproic acid[1] | — | | 225.10 | | | 337.7 | | |
| | d,l-methionine[2] | — | | | 256.04 | | | | |
| | DL-Threonine[1] | | | | | 100.0 | | | |
| | ε-caprolactam[3] | | | | | | | 97.09 | |
| 2B) | lactic acid (88% by wt/vol) | | | | | | | | 263.5 |
| 3) | deionized water | 284 | 568.2 | 595.00 | 633.00 | 202.0 | 655.0 | 267.00 | 495.0 |
| 4) | sulfamic acid | | | 62.53 | 62.53 | — | | 21.99 | |
| | Mole Ratio of Amino Acid to Bismuth | 3.5 | 3.5 | 2 | 2 | 3 | 3 | 2 | |

[1]available from Aldrich Chemical Company, Milwaukee, Wisconsin, USA.
[2]available from Fluka Chemical Company, Ronkonkoma, New York.
[3]available from Nipro Incorporated, Augusta, Georgia 30903.

For examples A1, A2 and the comparative example A, charges 2 and 3 were added to a round bottom flask and heated under agitation to 70C. For example A1, charge 1 was added in portions at 25 grams per hour, while for examples A2 through A4 and the comparative example A charge 1 was added at 50 grams per hour portions. For all the examples, the mixtures were stirred for an additional six hours. The mixture was then cooled to about 20° C. and solids were filtered off with filter paper and aspirator. For Examples A3, A4, A5, A6, charges 2 and 3 and for Example A7, charges 2, 3 and 4 were added to a round bottom flask equipped with a nitrogen blanket. In this addition for examples A3 and A4, charge 1 was added in portions at 50 grams per hour. For Examples A5 and A6, charge 3 was added in portions at 16.31 grams per hour, and for Example A7 charge 3 was added at 25 grams per hour. For Examples A3 and A4, charge 4 was added along with charge 2. For all the examples, the mixture was stirred for six hours and cooled to about 20C. For Example A1, the contents of the flask were filtered off with filter and aspirator to remove any remaining solids. For Example A3, the final product was a clear solution, while for Examples A4 and A5 the reaction product was a white slurry. For Example A7 the product was a yellowish slurry. For the comparative example A, after the reaction a vacuum was applied to remove 462.9 grams of water in a distillation trap and the powdered product was collected.

Example B

Example B(i)(1)

A quaternizing agent for use in preparing a pigment grinding vehicle was prepared from a mixture of the following ingredients:

| Ingredient | Parts by Weight |
|---|---|
| 2-ethylhexanol monourethane toluene diisocyanate in methyl isobutyl ketone | 320 |
| Dimethylethanolamine | 87.2 |
| 88% aqueous lactic acid solution | 117.6 |
| 2-butoxyethanol | 39.2 |

The 2-ethylhexanol monourethane toluene diisocyanate was added to the dimethylethanolamine in a suitable reaction vessel at room temperature. The mixture exothermed and was stirred for one hour at 80° C. Lactic acid was then charged followed by the addition of 2-butoxyethanol. The reaction mixture was stirred for about one hour at 65° C. to form the desired quaternizing agent.

Example B(ii) (2)

A pigment grinding vehicle was prepared from the following ingredients:

| Ingredient | Parts by Weight |
|---|---|
| EPON 829[4] | 710 |
| Bisphenol A | 289.6 |
| 2-ethylhexanol monourethane toluene diisocyanate in methyl isobutyl ketone | 406.4 |
| Quaternizing Agent of Example B(i)(1) | 496.3 |
| Deionized Water | 71.2 |
| 2-butoxyethanol | 56.8 |

[4]Diglycidyl ether of Bisphenol A available from Shell Oil and Chemical Co.

The EPON 829 and Bisphenol A were charged under a nitrogen atmosphere to a suitable reactor and heated to 150° C. to 160° C. to initiate an exotherm. The reaction mixture was permitted to exotherm for one hour at 150° C. to 160° C. The reaction mixture was then cooled to 120° C. and the 2-ethylhexanol half-capped toluene diisocyanate added. The temperature of the reaction mixture was held at 110° C. to 120° C. for one hour followed by the addition of the 2-butoxyethanol. The reaction mixture was then cooled to 85° C. to 90° C., homogenized and charged with water followed by the quaternizing agent. The temperature of the reaction mixture was held at 80° C. to 85° C. until an acid value of about 1 was obtained.

Example B(3)

Various pigment pastes incorporating the bismuth and amino acid catalytic mixtures or the bismuth of comparative example A of Table I were prepared as shown in the following Table II, where the amounts are in parts by weight.

TABLE II

| | | Examples | | | | | | |
|---|---|---|---|---|---|---|---|---|
| Charge | Material | B(1) | B(2) | B(3) | B(4) | B(5) | Comparative B | Comparative BB |
| 1 | Grind Resin of Example B(ii)(2) | 205.5 | 206.5 | 206.5 | 178.6 | 206.5 | 206.5 | 706.5 |
| 2 | Bismuth catalytic mixture of: | | | | | | | |
| | Example A1 | 175.2 | | | | | | |
| | Example A2 | | 397.7 | | | | | |
| | Example A4 | | | 408.9 | | | | |
| | Example A5 | | | | 344.9 | | | |
| | Example A7 | | | | | 345.6 | | |
| | Comparative Example A | | | | | | 177.4 | |
| 3 | China Clay[5] | 210 | 210 | 210 | 181.5 | 210 | 210.0 | 860.2 |
| 4 | TiO$_2$[6] | 306.1 | 297.7 | 288.5 | 253.2 | 317.0 | 318.5 | 1494.5 |
| 5 | Carbon Black[7] | 17.5 | 17.5 | 17.5 | 15.1 | 17.5 | 17.5 | 75.3 |
| 6 | Deionized Water | 382 | 223.4 | 534.0 | 349.9 | 707.0 | 394.5 | 1364.4 |

[5]Available from Engelhard Corporation as ASP-200.
[6]Titanium dioxide rutile available from E. I. DuPont de Nemours and Co. as R900.
[7]Available from Phelps Dodge-Colombian Chemicals as Raven 410.

The pigment pastes of Table II were prepared by the general method involving blending charge 1 with half of charge 6 in a suitable reactor equipped with a dispersion blade so that the blend is agitated until homogeneous. Charge 2 was added slowly until well blended and the mixture was then stirred for 15 minutes. Charges 3, 4 and 5 were added in order, adding more of charge 6 as needed to maintain a good mixing viscosity with adequate shear. The remainder of charge 6 was added and the mixture was blended for 15 minutes. The blend was charged into a Redhead Sandmill Model L3J available from Chicago Boiler Company with 1 millimeter (mm) ceramic grind beads and ground for one hour while maintaining the temperature below 30° C. Each paste was collected individually. The preparation of the paste of comparative example B differed from the above procedure in that Charges 3, 4 and 5 were added before Charge 2. The preparation of the paste of Comparative example BB differed from the above general method in that no bismuth reaction product was added as a charge 2.

Example C

Nine individual electrodeposition baths were prepared with the seven afore-prepared pastes of Table II and the bismuth reaction products (A3) and (A6) of Table I as shown in Table III where the amounts are in parts by weight.

baked at various temperatures to give a final film thickness of 0.8 to 0.9 mils (20.3 to 22.9 microns). These were tested for cure by resistance to double rubs with acetone as described below.

The cure response of the coating was determined after baking at several temperatures. The panels were cooled to ambient temperature then rubbed with a rag which was saturated with acetone. Significant pressure is applied and one double rub consists of one back and forth stroke with the rag across the width of a four-inch wide panel. Results in Table IV indicate the number of double rubs that were necessary to rub through the coating and expose the substrate. Greater than 100 double rubs is considered to be adequately cured.

TABLE III

| | | Examples | | | | | | | | |
|---|---|---|---|---|---|---|---|---|---|---|
| Charge | Material | C(1) | C(2) | C(3) | C(4) | C(5) | C(6) | C(7) | C(B) | C(BB) |
| 1 | Resinous Composition[8] | 948.6 | 948.6 | 1106.7 | 1106.7 | 1106.7 | 1106.7 | 1106.7 | 1106.7 | 948.6 |
| 2 | Pigment Paste of: | | | | | | | | | |
| | Example B(1) alanine | 104.3 | | | | | | | | |
| | Example B(2) glycine | | 108.8 | | | | | | | |
| | Example B(4) methionnine | | | | 156.4 | | | | | |
| | Example B(4) threonine | | | | | 143.8 | | | | |
| | Example B(5) caprolactam | | | | | | | | | |
| | Comparative Example BB | | | 121.7 | | | 121.7 | 169.4 | | 104.3 |
| | Comparative Example B | | | | | | | | 126.3 | |
| 2a | Reaction Product (A3) | | | 36.2 | | | | | | |
| 2b | Reaction Product (A6) | | | | | | 38.7 | | | |
| 3 | Deionized Water | 1347.0 | 1342.5 | 1135.3 | 1136.9 | 1149.5 | 1132.8 | 1123.9 | 1167.0 | 1347.0 |

[8]Commercially available from PPG Industries, Inc., as E6116. This composition is a blend of acid solubilized amine functional polyepoxide resin, blocked isocyanate curing agent and additives.

A general method for the preparation of the ED composition baths of Examples C1 through C7 and comparative examples C(B) and C(BB) involved blending Charges 1 and 2 in a suitable vessel under agitation and charge 3 was added to form the bath. The bath was ultrafiltered and twenty percent of the total bath was removed for each example and the ultrafiltrate was replaced with deionized water. The resulting paint had a pigment to binder ratio of 0.15 and a total solids of 18% for examples C1, C2, and comparative example C(BB) and a total solids of 21% for examples C3, C4, C5, C6, C7 and comparative example CB. For examples C3 and C6, Charges 1 and 2 were blended with agitation. Charge 2a for example C3 and charge 2b for example C6 and charge 4 were mixed and added to the other components to form the bath. The quantity of the bismuth amino acid catalytic mixture in the ED composition baths of examples C1 through C7 were 1.4 weight percent bismuth metal based on the resin solids of the ED composition baths.

Paint Application

Cold rolled steel panels available from Advanced Coatings Technologies (ACT) as B952P60 were electrodeposited at a paint temperature of 84° F. (28.9° C.) using 275 volts DC for a duration of two minutes. The panels were then

TABLE IV

Double Acetone Rub Resistance vs. Bake Temperature (30 minutes) and pH of the ED Composition Bath

| | Number of Double Rubs to Break Through Film | | |
|---|---|---|---|
| Paint | 310° F. (154.4° C.) bake | 340° F. (171.1° C.) bake | pH |
| Example C1 (With Bismuth Alanine) | >100 | >100 | 6.17 |
| Example C2 (With Bismuth Glycine) | >100 | >100 | 6.05 |
| Example C3 with Bismuth Aminocaproic Acid | >100 | >100 | 6.01 |
| Example C4 with Bismuth Methionine | >100 | >100 | 5.78 |
| Example C5 with threonine | >100 | >100 | 6.35 |
| Example C6 with aminocaproic acid | 40 | >100 | 6.10 |
| Example C7 with caprolactam | 100 | 100 | 5.96 |
| Comparative Example CB with Bismuth Lactic Acid | 100 | 100 | 4.58 |
| Comparative Example CBB (Without Bismuth) | 4 | 5 | 5.90 |

The data reported in the above table indicates that the bismuth/amino acid catalytic mixtures used in the ED composition baths of the present invention are clearly catalytic, causing a curing reaction to take place between the cationic group containing resin and the capped polyisocyanate curing agent. Also, the data shows that the bismuth/amino acid catalytic mixture results in a higher pH for the ED compositions than a reaction product of bismuth and lactic acid. The pH was measured by a standard pH meter with a glass electrode from Fisher Scientific International, Inc., Pittsburgh, Pa.

We claim:

1. Curable electrodepositable coating composition comprising (a) an active hydrogen-containing, cationic salt group-containing resin electrodepositable on a cathode; (b) an at least partially capped polyisocyanate curing agent; and (c) a catalyst comprised of bismuth and an amine-containing carboxylic acid selected from the group consisting of-amino acid and amino acid precursors.

2. The composition of claim 1 in which the active hydrogen-containing, cationic salt group-containing resin is derived from a polyepoxide.

3. The composition of claim 2 in which the polyepoxide is a polyglycidyl ether of a polyhydric alcohol.

4. The composition of claim 2 in which the cationic salt groups are amine salt groups.

5. The composition of claim 4 in which the amine salt groups are derived from basic nitrogen groups neutralized with an acid selected from the group consisting of formic acid, acetic acid, lactic acid, phosphoric acid, sulfamic acid, and mixtures thereof.

6. The composition of claim 1 in which the catalyst of component (c) is a reaction product of bismuth and an amine-containing carboxylic acid selected from the group consisting of amino acids and amino acid precursors and is present in the electrodepositable coating composition in amounts of about 0.24 to about 3 percent by weight bismuth based on the total weight of solids in the electrodepositable coating composition.

7. The composition of claim 6 in which the catalyst of component (c) is derived from bismuth in the form of an oxide or salt of bismuth reacted with an amino acid containing from about 2 to about 20 carbon atoms.

8. The composition of claim 7 wherein the oxide or salt of bismuth is selected from the group consisting of bismuth nitrate, bismuth hydroxide, bismuth trioxide, and bismuth oxide.

9. The composition of claim 8 wherein the oxide of bismuth is selected from the group consisting of bismuth trioxide and bismuth oxide.

10. The composition of claim 8 further comprising a salt selected from the group consisting of zinc salts, manganese salts, tin salts, zirconium salts, and mixtures thereof.

11. The composition of claim 1 in which the amino acid is N-substituted.

12. The composition of claim 1 in which the amino acid is an alpha-amino acid.

13. The composition of claim 1 wherein the amino acid is selected from the group consisting of alanine, glycine, aspartic acid, beta-alanine, 6-aminocaproic acid, methionine, leucine, taurine, serine, threonine, and mixtures thereof.

14. The composition of claim 1 in which the amino acid is selected from the group consisting of methionine, aminocaproic acid, glycine, and tyrosine.

15. The composition of claim 1 wherein the amino acid precursor is a lactam that hydrolyzes into an amino acid.

16. The composition of claim 1 wherein catalyst has a ratio of moles of amino acid to moles of bismuth in the range of about one to one up to about five to one.

17. The composition of claim 16 wherein catalyst has a ratio of moles of amino acid to moles of bismuth in the range of about 1:1 up to about 3.5:1.

18. The electrodepositable composition of claim 1 in which the active hydrogen-containing, cationic salt group-containing resin is present in amounts of about 55 to 75 percent by weight, based on weight of main vehicle resin solids.

19. The electrodepositable composition of claim 1 in which the capped polyisocyanate curing agent is present in amounts of about 25 to 45 percent by weight, based on weight of main vehicle resin solids.

20. The electrodepositable composition of claim 1 which is curable at a temperature range of about 300° F. to 340° F. (148.8° C. to 171.1° C.).

21. The composition of claim 1 which has a pH of at least 5.5.

22. The electrodepositable composition of claim 1 that is free of lead.

23. A method of electrocoating an electroconductive substrate which serves as a cathode in an electrical circuit comprising said cathode and an anode immersed in an aqueous electrodepositable composition containing a cationic water dispersible resin, said method comprising passing an electric current between the anode and the cathode to cause the electrodepositable composition to deposit on the cathode as a continuous film, and heating the electrodeposited film at an elevated temperature to cure the film, wherein the electrodepositable curable composition is the electrodepositable curable coating of claim 1.

* * * * *